US007449995B1

(12) United States Patent
Clanton-Holloway

(10) Patent No.: US 7,449,995 B1
(45) Date of Patent: Nov. 11, 2008

(54) OIL CHANGE METER

(76) Inventor: Eula Clanton-Holloway, 16 Arta La., Greensboro, NC (US) 27406

( * ) Notice: Subject to any disclaimer, the term of this patent is extended or adjusted under 35 U.S.C. 154(b) by 200 days.

(21) Appl. No.: 11/273,499

(22) Filed: Nov. 14, 2005

(51) Int. Cl.
*B60Q 1/00* (2006.01)

(52) U.S. Cl. .................... 340/438; 340/457.4; 340/439; 340/450.3; 701/29; 701/30

(58) Field of Classification Search ................. 340/438, 340/457.4, 439, 450.2, 450.3; 701/21, 29, 701/30
See application file for complete search history.

(56) References Cited

U.S. PATENT DOCUMENTS

| | | | | |
|---|---|---|---|---|
| 1,564,583 | A | 12/1925 | Koudriavzeff et al. | 116/62.4 |
| 3,940,735 | A | 2/1976 | Kronenberg | 340/457.4 |
| 4,284,972 | A | 8/1981 | Chiu et al. | 340/457.4 |
| 4,306,525 | A | 12/1981 | Faxvog | 123/196 S |
| 4,694,793 | A | 9/1987 | Kawakita et al. | 123/196 S |
| 4,742,476 | A | 5/1988 | Schwartz et al. | 701/30 |
| 5,530,647 | A | 6/1996 | Sem et al. | 701/30 |
| 5,705,977 | A * | 1/1998 | Jones | 340/457.2 |
| 6,172,602 | B1 * | 1/2001 | Hasfjord | 340/438 |
| 6,208,245 | B1 | 3/2001 | Post et al. | 340/457.4 |
| 6,222,445 | B1 | 4/2001 | Beckhusen | 340/457 |
| 6,542,074 | B1 * | 4/2003 | Tharman et al. | 340/457.4 |
| 6,564,126 | B1 * | 5/2003 | Lin et al. | 701/30 |
| 6,812,825 | B1 * | 11/2004 | Volk | 340/309.16 |
| 6,927,682 | B1 * | 8/2005 | Touhey et al. | 340/457.4 |
| 7,129,827 | B2 * | 10/2006 | Bai | 340/438 |

FOREIGN PATENT DOCUMENTS

| | | |
|---|---|---|
| JP | 9100712 | 4/1997 |
| JP | 2003328721 | 11/2003 |

* cited by examiner

*Primary Examiner*—Toan N Pham
(74) *Attorney, Agent, or Firm*—Michael I Kroll

(57) ABSTRACT

An indicator device used in a vehicle to inform the user when or how many miles are left until said vehicle requires an oil change. Comprising the present invention is an interface having a trip reset button to be installed to a vehicle's dashboard having a display to indicate the amount of miles remaining for the effective life left in the oil, and a second colored indicator that lights up one default color (typically green) while the oil is good, and then also flashes a different color (typically red) when the oil has reached it's expiration.

2 Claims, 8 Drawing Sheets

OIL CHANGE METER

BACKGROUND OF THE INVENTION

1. Field of the Invention

The present invention relates generally to gauges and indicators and, more specifically, to an indicator or gauge device used in a vehicle to inform the user when or how many miles are left until said vehicle requires an oil change. Comprising the present invention is an interface having a trip reset button to be installed to a vehicle's dashboard having a display to indicate the amount of miles remaining for the effective life left in the oil, and a second colored indicator that lights up one default color (typically green) while the oil is good, and then also flashes a different color (typically red) when the oil has reached it's expiration. When in use the user sets the device to a predetermined value utilizing the reset trip switch right after an oil change takes place, then while the vehicle is in transit the odometer of the vehicle that is interfaced with the present invention depletes the value displayed on screen till zero is reached.

2. Description of the Prior Art

There are other indicating devices designed for telling the user to service their vehicles oil. Typical of these is U.S. Pat. No. 1,564,583 issued to Koudriavzeff, et al. on Dec. 8, 1925.

Another patent was issued to Kronenberg on Feb. 24, 1976 as U.S. Pat. No. 3,940,735. Yet another U.S. Pat. No. 4,284,972 was issued to Chiu, et al. on Aug. 18, 1981 and still yet another was issued on Dec. 22, 1981 to Faxvog as U.S. Pat. No. 4,306,525.

Another patent was issued to U.S. Pat. No. 4,694,793 on Sep. 22, 1987 as U.S. Pat. No. 4,694,793. Yet another U.S. Pat. No. 4,742,476 was issued to Schwartz, et al. on May 3, 1988. Another was issued to Sem, et al. on Jun. 25, 1996 as U.S. Pat. No. 5,530,647 and still yet another was issued on Mar. 27, 2001 to Post, et al. as U.S. Pat. No. 6,208,245.

Another patent was issued to Beckhusen on Apr. 24, 2001 as U.S. Pat. No. 6,222,445. Yet another U.S. Pat. No. 6,564,126 was issued to Lin, et al. on May 13, 2003. Another was issued to Kenji on Apr. 15, 1997 as Japanese. Patent No. JP9100712 and still yet another was issued on Nov. 19, 2003 to Kazuyuki, et al. as Japanese Patent No. JP2003328721.

U.S. Pat. No. 1,564,583

Inventor: Michel V. Koudriavzeff, et al.

Issued: Dec. 8, 1925

The combination with a cyclometer of a hinged signaling element bearing instructions to the operator, a spring urging said element and said cyclometer to permit movement to visible position when the cyclometer counters reach a predetermined position, said releasing mechanism comprising a cam having a geared connection with the cyclometer and including a hammer actuated by said cam and a catch controlled by said hammer; substantially as desired.

U.S. Pat. No. 3,940,735

Inventor: Hartmut Kronenberg

Issued: Feb. 24, 1976

Device for indicating when a vehicle has traveled a predetermined distance, calling for inspection or servicing of some part of the vehicle. An electrochemical indicator integrates a signal indicative of the vehicle speed to provide an output indication.

U.S. Pat. No. 4,284,972

Inventor: Randolph K. Chiu, et al.

Issued: Aug. 18, 1981

An apparatus for providing a service reminder when a vehicle has accumulated a predetermined mileage comprises a potentiometer operated by the highest order number wheel of the vehicle odometer to provide an output voltage which changes incrementally with each indexing motion of that number wheel. An electrical detector responsive to the potentiometer output energizes a signal lamp when the output reaches a voltage in a predetermined range representing a desired service interval. An electrical connector in circuit with the potentiometer can be disconnected to change the potentiometer voltage to a value outside the predetermined range to allow the service reminder circuit to turn off the indicator lamp when the indicated service has been performed. The apparatus is adapted to operate in conjunction with an electronic engine control module which can be programmed to detect the predetermined value of the potentiometer output and to operate a signal lamp. The potentiometer output in addition provides information to the electronic control module on the accumulated mileage of the vehicle.

U.S. Pat. No. 4,306,525

Inventor: Frederick R. Faxvog

Issued: Dec. 22, 1981

A single optical sensor coupled to an oil return line in an internal combustion engine is coupled to a control circuit for determining during a first time interval when the engine is started whether the crankcase oil level is sufficient and during a second time interval after the engine is running whether the oil needs to be changed.

U.S. Pat. No. 4,694,793

Inventor: Tsunehiro Kawakita, et al.

Issued: Sep. 22, 1987

In order to obviate the need to manually input data relating to the grade of oil used to lubricate an engine, a monitoring system includes a sensor which senses the grade of oil along with sensors which enable the oil change procedure per se to be detected. After each oil change the output of the oil grade sensor is read and the appropriate values which determine the limits to which the oil may be permitted to degradate are automatically determined.

U.S. Pat. No. 4,742,476

Inventor: Ellen S. Schwartz, et al.

Issued: May 3, 1988

A number indicative of the number of engine revolutions corresponding to the useful life of the engine oil in a motor vehicle is stored in nonvolatile memory. As the vehicle is operated, the number is periodically decremented by an amount determined in relation to a penalty factor and the number of engine revolutions which occur in the period. The penalty factor is periodically updated and is determined in relation to the operating temperature of the engine oil, based on empirically determined data. The stored number represents the remaining life of the engine oil and is continuously displayed for the information of the operator. A warning lamp is lit to alert the operator to change the oil soon when the stored number is reduced to within 10% of the originally stored value. When the oil is changed, a reset switch is actuated and the number is reset to its original value.

U.S. Pat. No. 5,530,647

Inventor: Thomas R. Sem, et al.

Issued: Jun. 25, 1996

A method of dynamically determining engine oil change intervals for an internal combustion engine having selectable high and low operating speeds HS and LS, respectively. The method includes the steps of accumulating operating time THS of the internal combustion engine at speed HS, accumulating operating time TLS of the internal combustion engine at speed LS, calculating a high speed factor HSF as a function of the accumulated engine operating time THS, and calculating a low speed factor LSF as a function of the accumulated engine operating time TLS. The method then sums the high speed and slow speed factors HSF and LSF to provide a sum S which is compared with a predetermined constant K1. A signal indicating the engine oil should be changed is provided when the comparison step finds the sum S has reached the predetermined constant K1. In a preferred embodiment, the method also includes the step of detecting when the engine oil of the internal combustion engine has been changed, and the step of resetting the accumulated high and low speed operating times THS and TLS, respectively, when the detecting step detects that the engine oil has been changed.

U.S. Pat. No. 6,208,245

Inventor: Stephen F. Post, et al.

Issued: Mar. 27, 2001

In a preferred embodiment, an engine oil change indicator system, including: a combination engine oil pressure sensor and engine oil temperature sensor connected to a port on the engine to which port is normally connected an oil pressure switch; and a microprocessor connected to receive inputs from the combination engine oil pressure sensor and engine oil temperature sensor and to cause a low engine oil pressure warning light to be illuminated when the microprocessor has calculated from the inputs that the engine oil should be changed.

U.S. Pat. No. 6,222,445

Inventor: Fred K. Beckhusen

Issued: Apr. 24, 2001

An engine service monitoring system and method for an engine having a spark plug, an ignition circuit with a transformer and a spark plug wire disposed between the spark plug and a coil of the transformer. A counting circuit for counting the ignition or spark pulses is inductively coupled to the spark plug wire such that for every spark pulse generated, a DC pulse is provided by a rectifier of the counting circuit. The DC pulses are provided to a computing element which computes the total number of the pulses, selectively adjusts the count on the basis of a low-oil pressure condition, an out-of-range temperature condition or other suitable operator-defined condition. The computing element also compares the adjusted count with one or more service change interval threshold values to provide an alarm to indicate that a service change is needed. The threshold values are either factory-set or field-adjustable.

U.S. Pat. No. 6,564,126

Inventor: Yingjie Lin, et al.

Issued: May 13, 2003

A system for automatically resetting an oil condition alarm light after an oil change includes an in-vehicle digital processing apparatus electrically coupled to a warning lamp and to an oil sensor installed in an engine oil pan. The digital processing apparatus further includes a warning lamp reset module to automatically reset the oil sensor following an oil change, based on an oil parameter difference value.

Japanese Patent Number JP9100712

Inventor: Furuichi Kenji

Issued: Apr. 15, 1997

PROBLEM TO BE SOLVED: To provide a method and a device for predicting a lubricating oil life, which is capable of accurately predicting the remaining life of lubricating oil even when a change occurs in a vehicular traveling pattern and directly displaying a distance to be traveled until the life of the lubricating oil expires.

SOLUTION: A lubricating oil life predicting device is provided with a lubricating oil analyzing means 2 for analyzing the rate of a pentane insoluble amount contained in lubricating oil or the total acid value of the lubricating oil by measuring the infrared ray absorption level of the lubricating oil, a traveling distance measuring means 8 for integrating traveling distances from the time of exchanging the lubricating oil with another, a calculating means 4 for selecting a function having a highest relative coefficient from a plurality of preset functions as a regression approximate curve by using the measured deterioration level of the lubricating oil and the traveling distance and calculating a distance to be traveled by applying the limit value of the deterioration of the lubricating oil to the regression approximate curve and a display means 9 for displaying the calculated distance to be traveled.

Japanese Patent Number JP2003328721

Inventor: Horie Kazuyuki, et al.

Issued: Nov. 19, 2003

PROBLEM TO BE SOLVED: To provide a method and device for detecting oil degradation that can accurately detect an oil life and also detect progress before and after a life point.

SOLUTION: The acidity and basicity of oil for a vehicle are measured using a pH sensor 11 that carries out output corresponding to the acidity and basicity of oil, and the degradation of oil for the vehicle is detected on the basis of the change of an approximate line approximate to the output of the pH sensor 11 to the travel distance of the vehicle, from the first inclination to the second inclination larger than the first inclination and the change from the second inclination to the third inclination smaller than the second inclination with the increase of the travel distance.

While these indicators may be suitable for the purposes for which they were designed, they would not be as suitable for the purposes of the present invention, as hereinafter described.

SUMMARY OF THE PRESENT INVENTION

A primary object of the present invention is to provide an indicator utilized in to determine and provide visual indication pertaining to the status of a user's vehicle oil.

Another object of the present invention is to provide an indicator that works in relation with a vehicle's odometer to provide a visual display depicting the amount of miles left on the oil.

Yet another object of the present invention is to provide an indicator having a reset switch for resetting the present invention after an oil change.

Still yet another object of the present invention is to provide an indicator having various color themes in relation to the status of the oil (typically red and green).

Another object of the present invention is to provide an indicator having a modular form easily installed and adapted to motor vehicles.

Additional objects of the present invention will appear as the description proceeds.

The present invention overcomes the shortcomings of the prior art by providing a modular easily installed indicator that works in association with a vehicle's odometer to indicate when an oil change is needed or how many more miles are left on the life of the oil.

Additionally the present invention has a lighted display that displays the life of the oil left in miles and can blink or light up to a predetermined color (typically red and green) to indicate status.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
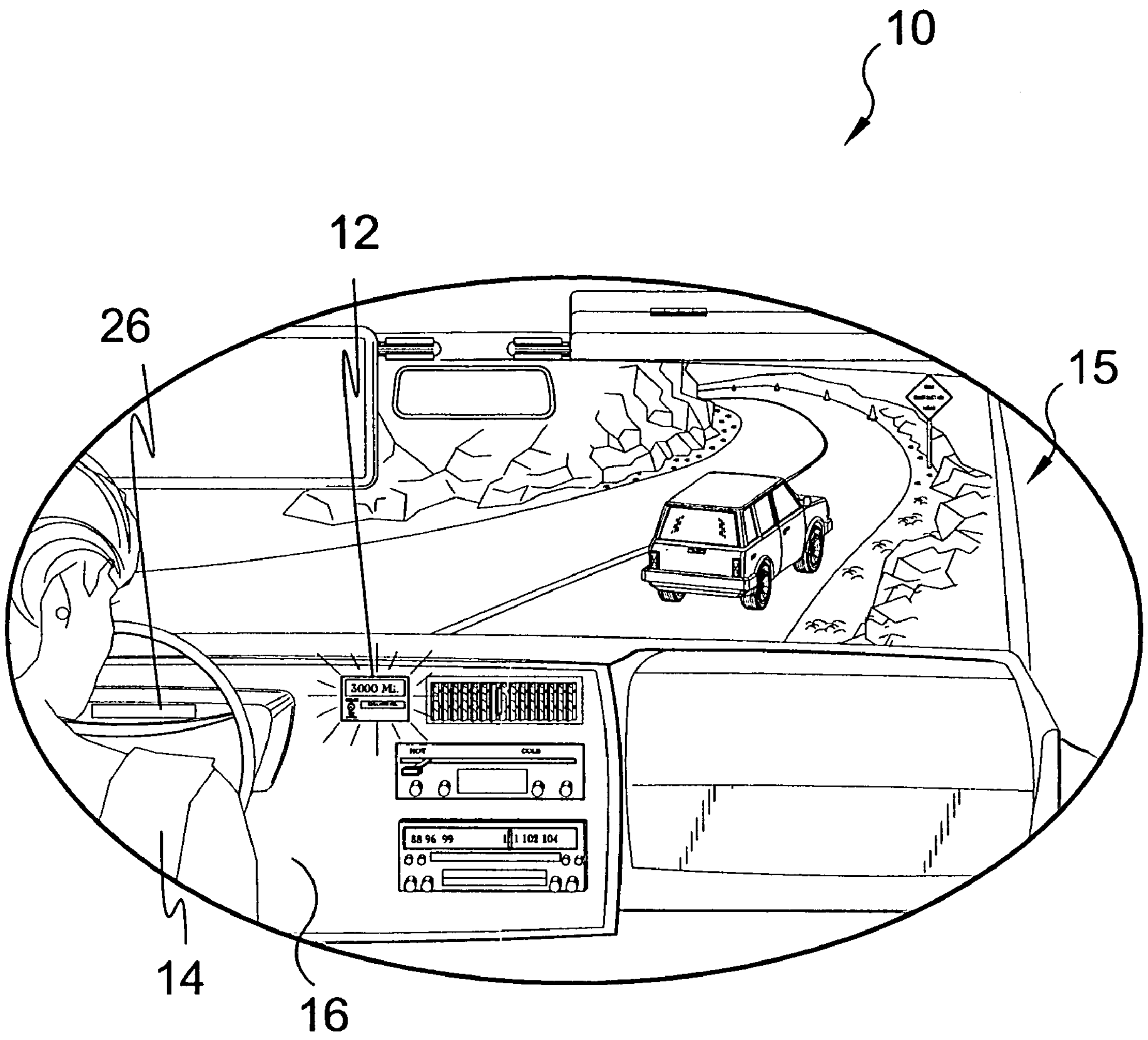
FIG. 1 is an illustrative view of the present invention in use.

Turning now descriptively to the drawings, in which similar reference characters denote similar elements throughout the several views, the figures illustrate the Automotive Oil Change Meter of the present invention. With regard to the reference numerals used, the following numbering is used throughout the various drawing figures.

10 Automotive Oil Change Alert Apparatus of the present invention
12 oil change meter
14 driver
15 motor vehicle
16 dashboard of 15
18 reset button
20 illuminable element
22 oil change indicator meter
26 auto odometer
28 wire to vehicle odometer
30 wire to power source
32 digital timing device

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention 10 is an oil change indicator meter 10 disposed on the dashboard 16 of a motor vehicle 15 informing the driver 14 as to when the next oil change is due. The oil change reminder meter 12 includes a digital countdown display interfaced with the vehicle odometer 26 that incrementally counts down from a predetermined value (typically 3000 miles) to inform the driver 14 that an oil change is soon due. An illuminable element may also be included to inform the driver of the oil change status wherein a first color (typically green) indicates a non-oil change status and a second color (preferably red) indicates an oil change status is in effect.

Figure 2:
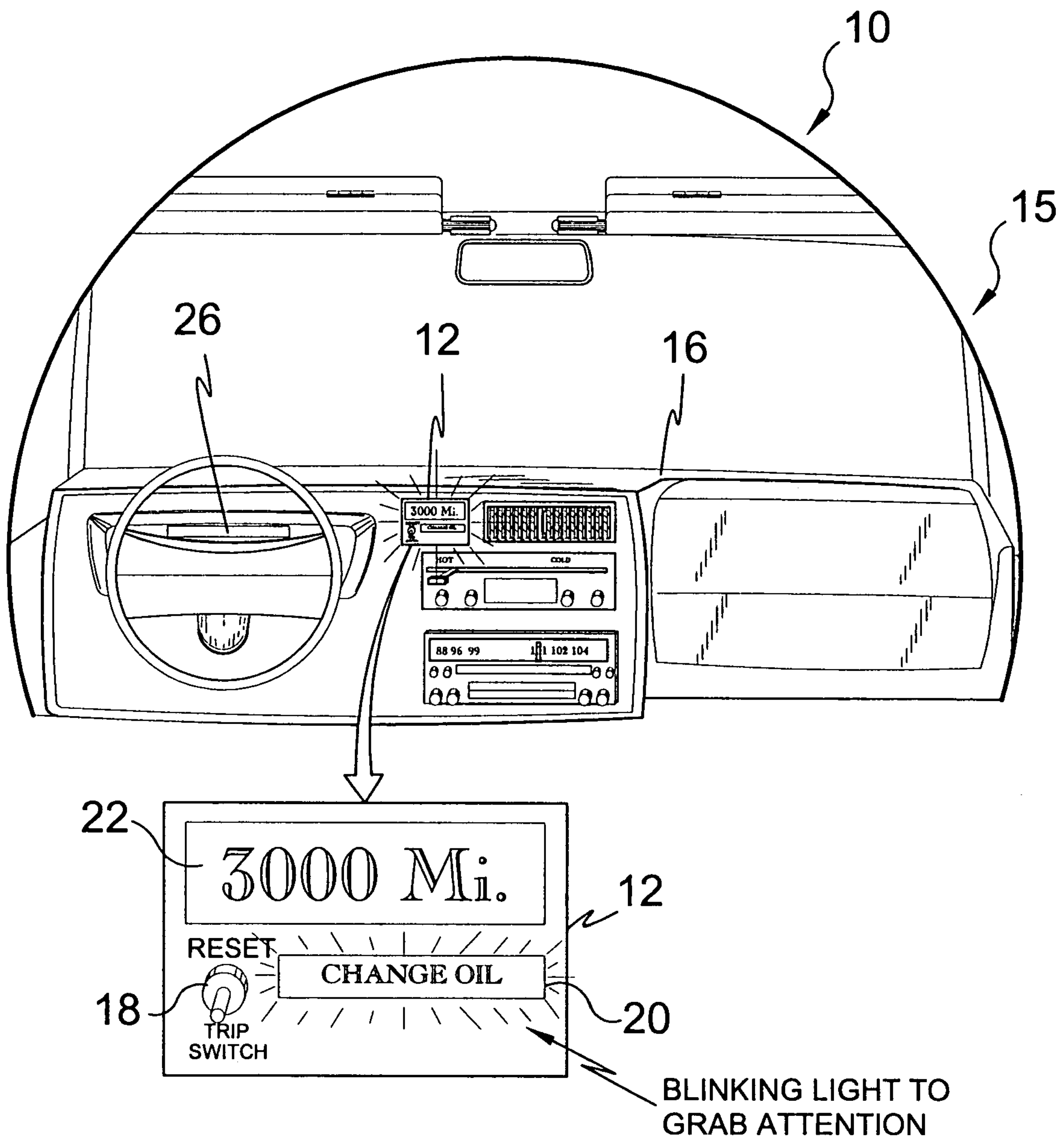
FIG. 2 is an illustrative view of the present invention in use.

FIG. 2 is an illustrative view of the present invention 10 in use. The present invention 10 is an oil change indicator meter 10 disposed on the dashboard 16 of a motor vehicle 15 informing the driver as to when the next oil change is due. The oil change reminder meter 12 includes a digital countdown display 22 interfaced with the vehicle odometer 26 that incrementally counts down from a predetermined value (typically 3000 miles) to inform the driver that an oil change is soon due. An illuminable element 20 may also be included to inform the driver of the oil change status wherein a first color (typically green) indicates a non-oil change status and a second color (preferably red) indicates an oil change status is in effect. A reset switch 18 is provided to reset the reminder meter 12 once an oil change is performed.

Figure 3:
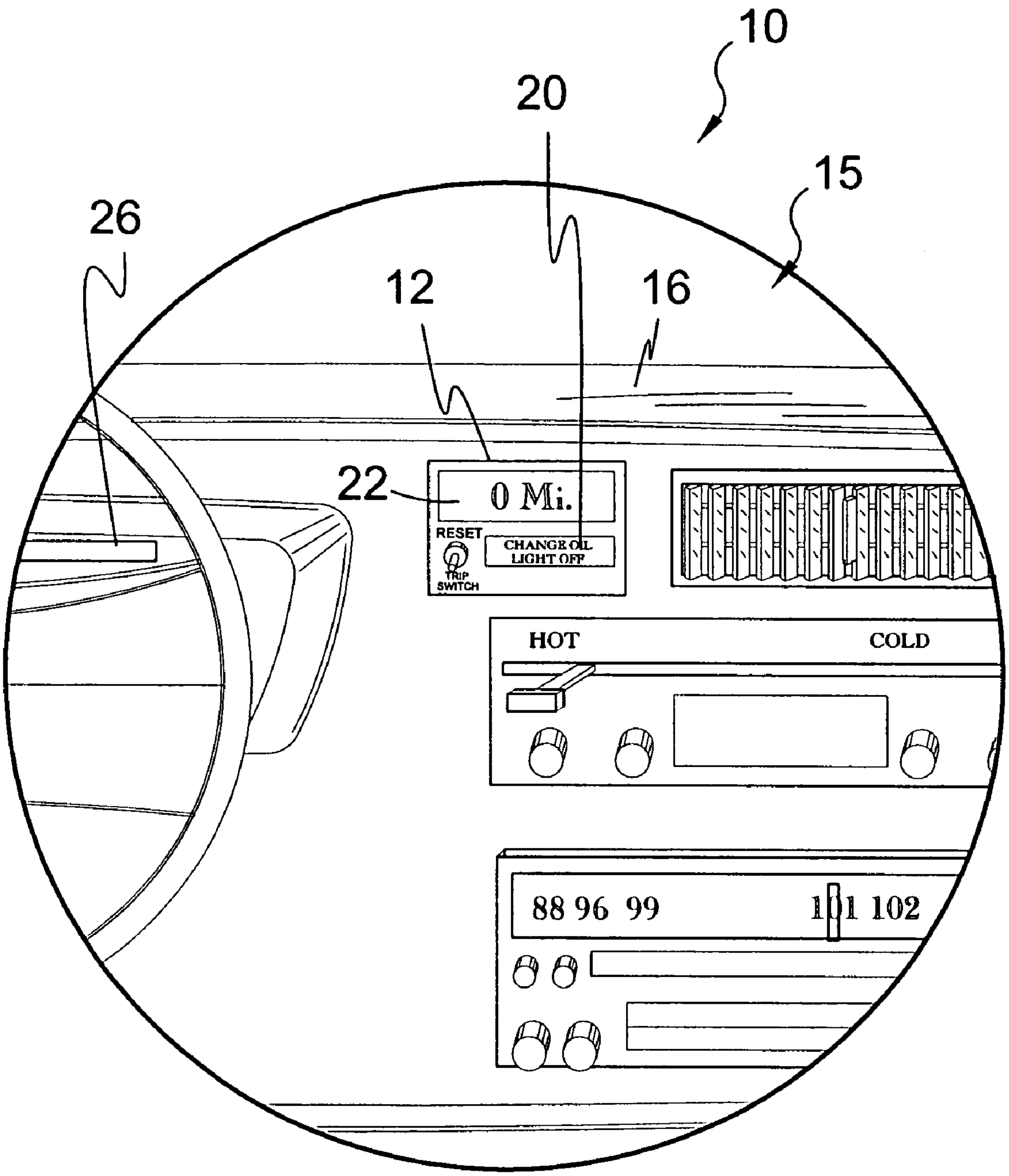
FIG. 3 is a detailed view of the present invention in a non oil change status.

FIG. 3 is a detailed view of the present invention 10 in a non oil change status. The present invention 10 is an oil change indicator meter 10 disposed on the dashboard 16 of a motor vehicle 15 informing the driver as to when the next oil change is due. The oil change reminder meter 12 includes a digital countdown display interfaced with the vehicle odometer 26 that incrementally counts down from a predetermined value (typically 3000 miles) to inform the driver that an oil change is soon due. An illuminable element may also be included to inform the driver of the oil change status wherein a first color (typically green) indicates a non-oil change status and a second color (preferably red) indicates an oil change status is in effect.

Figure 4:
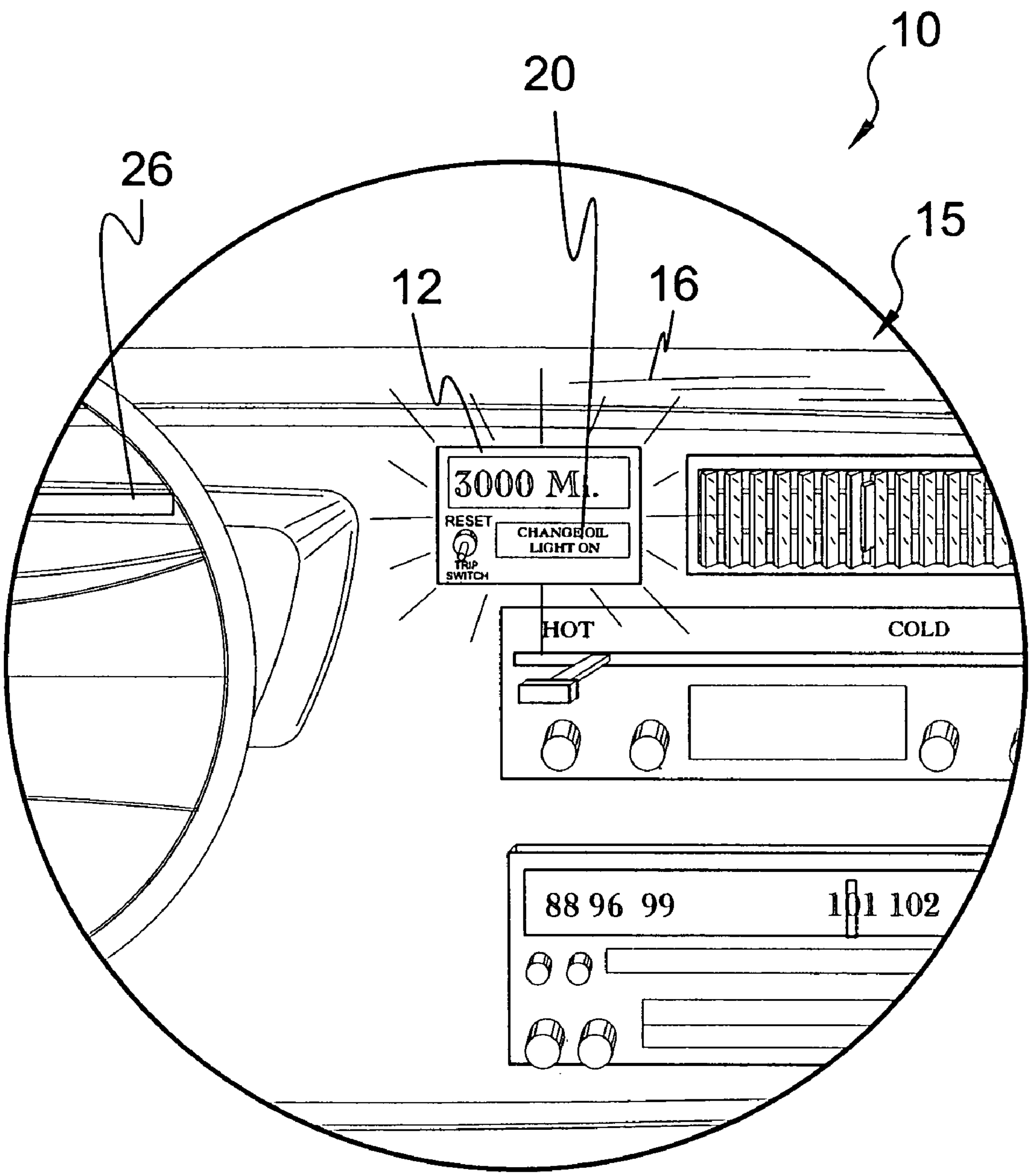
FIG. 4 is a detailed view of the present invention in an oil change status.

FIG. 4 is a detailed view of the present invention 10 in an oil change status. The present invention 10 is an oil change indicator meter 10 disposed on the dashboard 16 of a motor vehicle 15 informing the driver as to when the next oil change is due. The oil change reminder meter 12 includes a digital countdown display 22 interfaced with the vehicle odometer 26 that incrementally counts down from a predetermined value (typically 3000 miles) to inform the driver that an oil change is soon due. An illuminable element 20 may also be included to inform the driver of the oil change status wherein a first color (typically green) indicates a non-oil change status and a second color (preferably red) indicates an oil change status is in effect.

Figure 5:
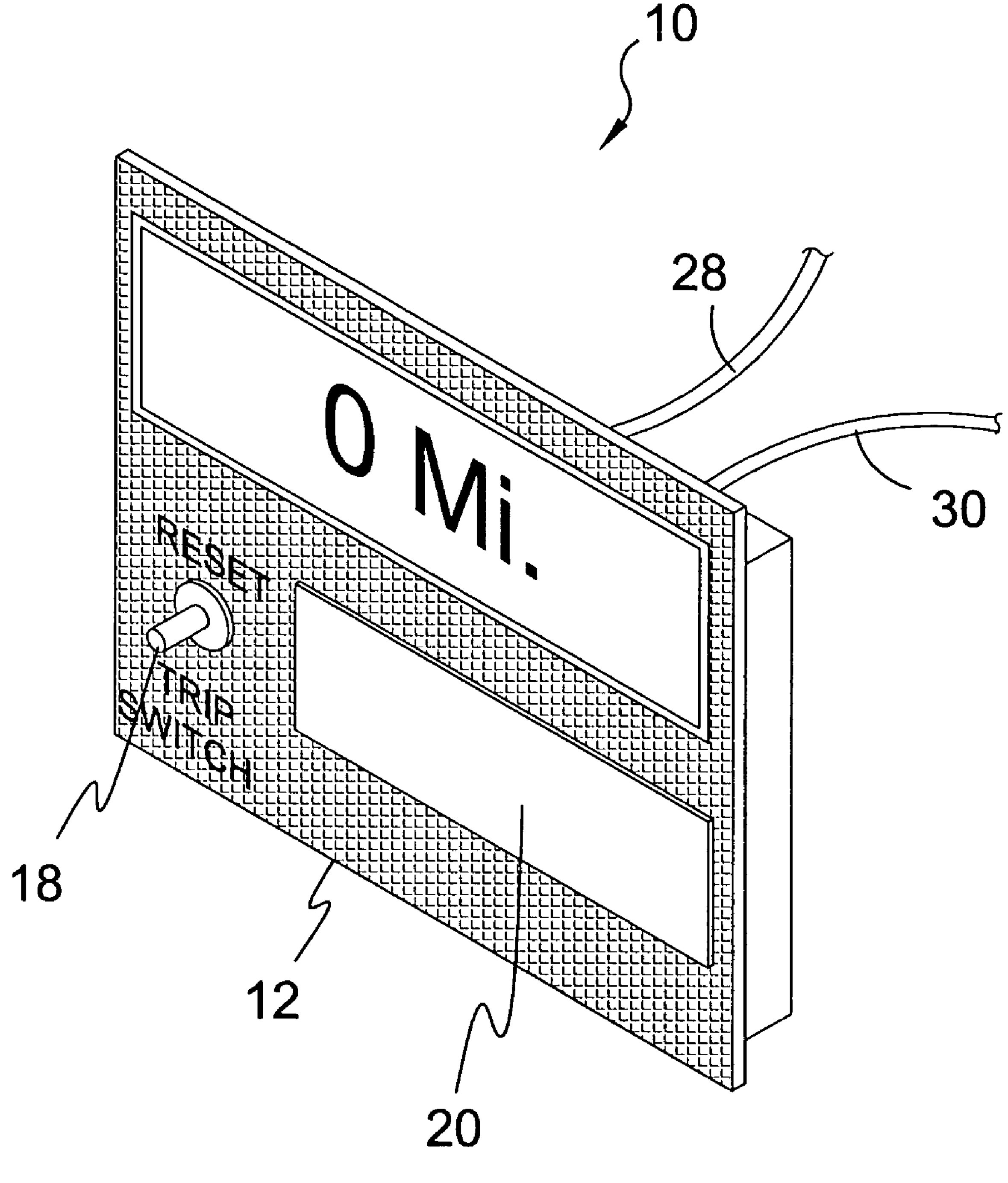
FIG. 5 is a perspective view of the present invention in a non oil change status.

FIG. 5 is a perspective view of the present invention 10 in a non oil change status. Shown is the oil change reminder meter 12 having a digital countdown display 22, an illuminable element 20, a reset switch 18, a wire 28 leading to the vehicle odometer and a wire 30 leading to a power source.

Figure 6:
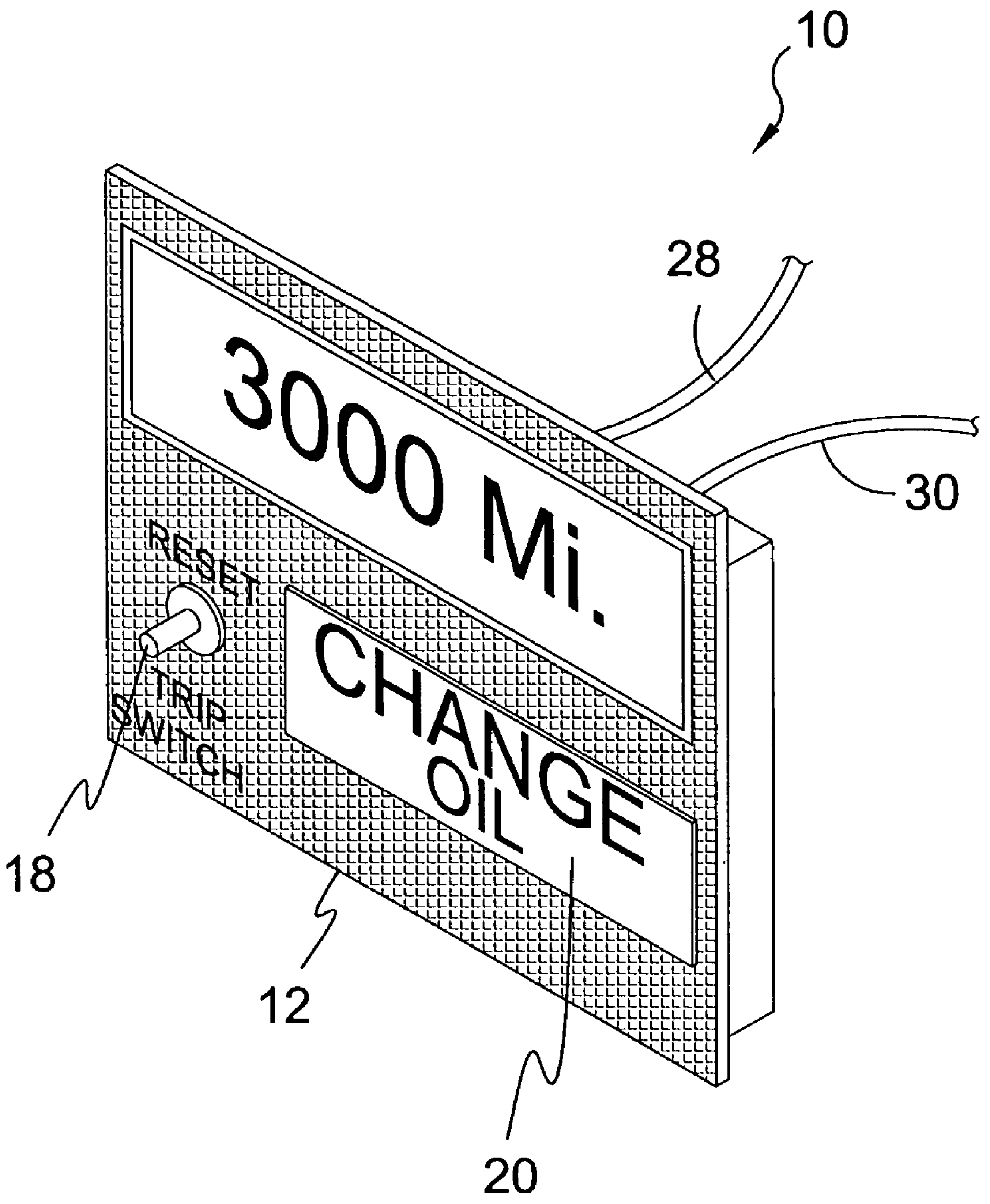
FIG. 6 is a perspective view of the present invention in an oil change status.

FIG. 6 is a perspective view of the present invention in an oil change status. Shown is the oil change reminder meter 12 having a digital countdown display 22, an illuminable element 20, a reset switch 18, a wire 28 leading to the vehicle odometer and a wire 30 leading to a power source.

Figure 7:
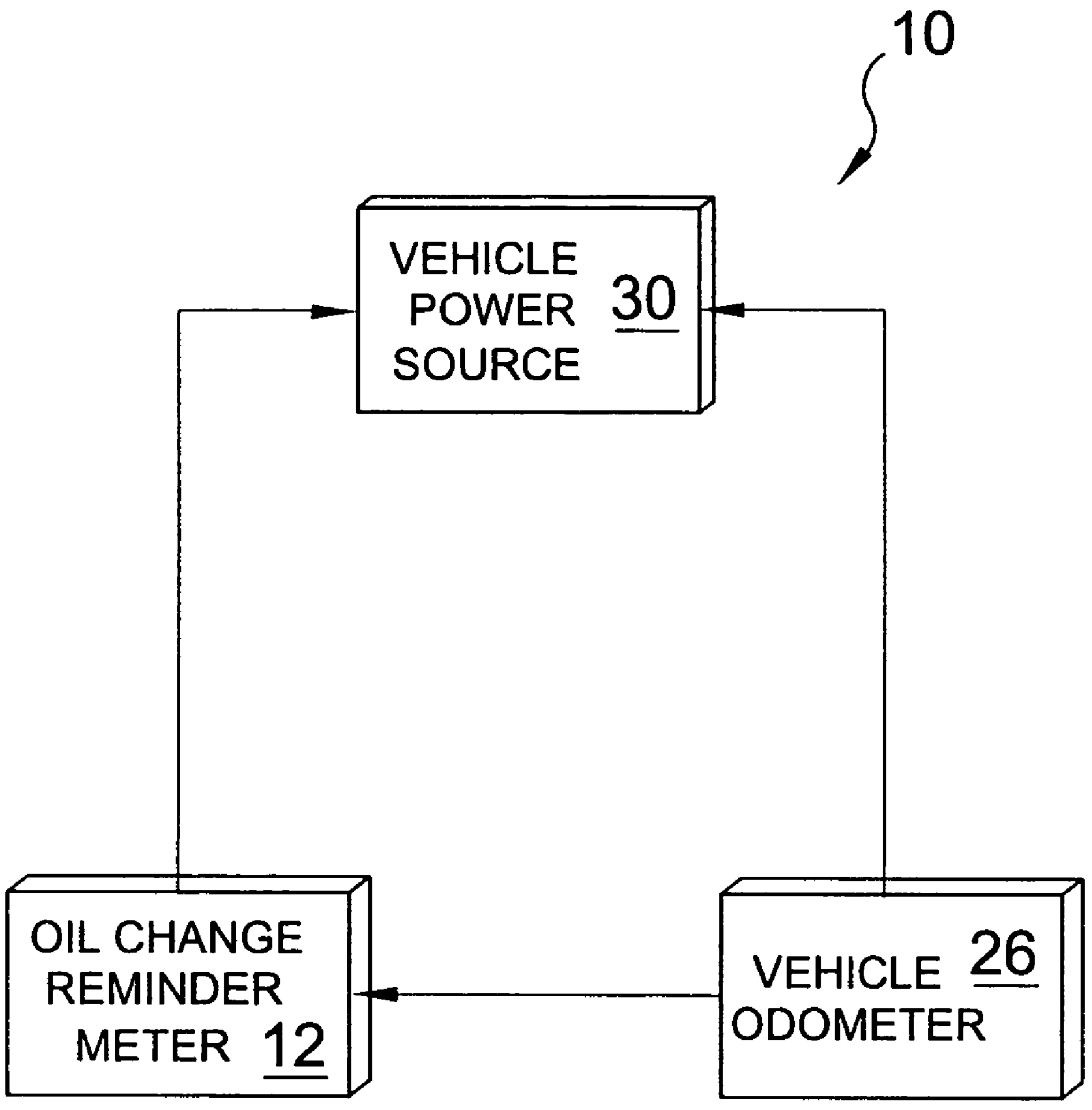
FIG. 7 is a block diagram of the associated components of the present invention.
Figure 8:
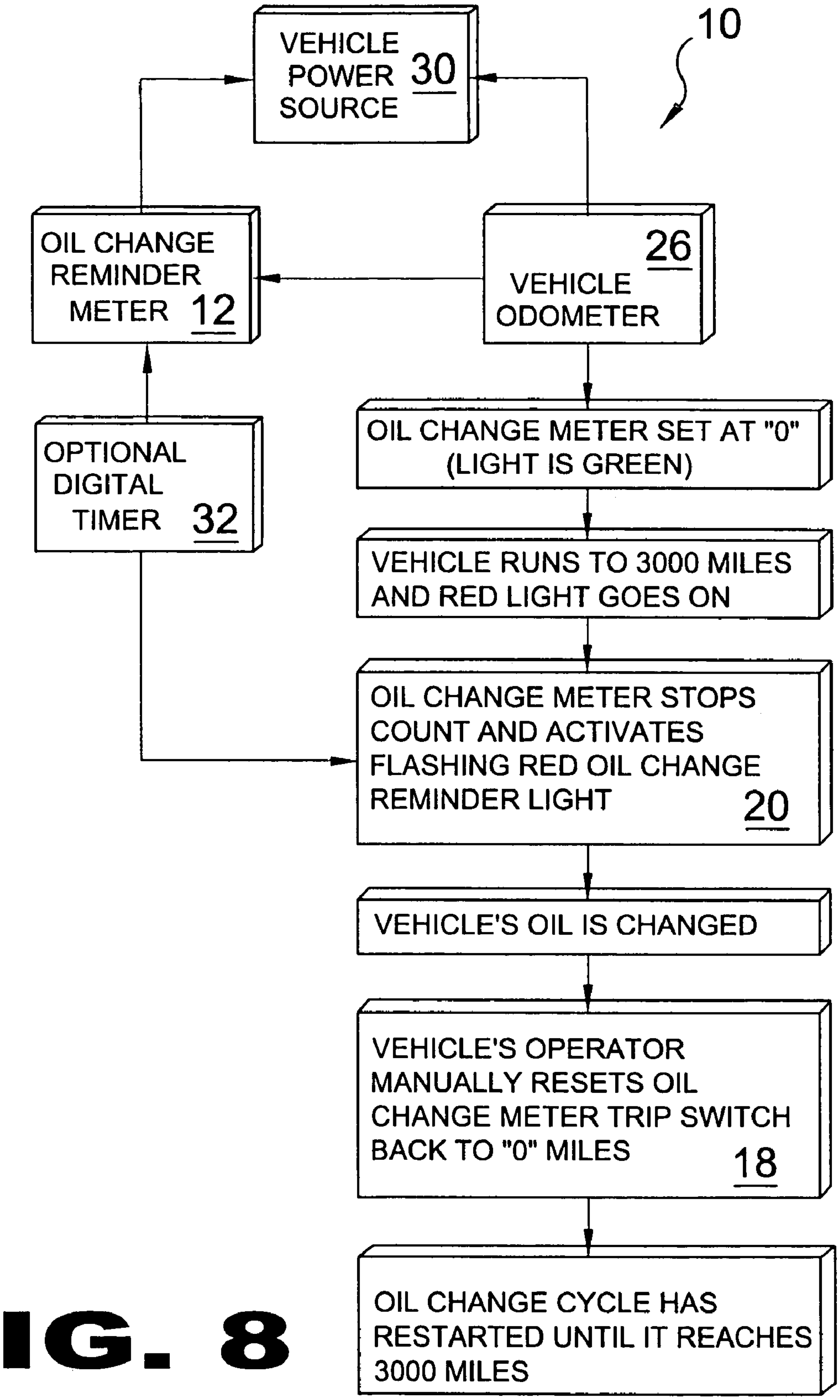
FIG. 8 is a flow chart of the present invention.

FIG. 7 is a block diagram of the associated components of the present invention 10. The present invention 10 is a method and apparatus determining vehicle engine oil change comprising an oil change illuminable member energized upon decrementing a counter to a zero value that is interfaced with the vehicle odometer. Said counter having a predetermined starting value displayed by said counter with switch means for resetting said counter to a starting value. The illuminable element optionally including a first and second color, said first color, typically green indicates a non oil change status and a second color, typically red indicating an oil change status. The oil change reminder meter 12 is in communication with the vehicle odometer 26 and the vehicle power source FIG. 8 is a flow chart of the present invention 10. Shown are the primary components of the present invention and the resultant functions thereof wherein the oil change reminder meter 12 is in communication with the vehicle power source 30 and the vehicle odometer 26. An optional digital timer 32 may also be included to initiate the illuminable member 20 and override the mileage countdown after a predetermined period of time (typically six months) if the mileage has not been reached prior to that. The reset button 18 serves to reset the mileage countdown in the display and the digital timer 32 if one is included.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An oil change indicator meter for providing a visual indicator for informing a driver as to when the next oil change for a motor vehicle is due comprising:

a) a visual countdown display on a dashboard of a vehicle having a reset switch for setting a number of miles for the next oil change after an oil change has been made including a first screen showing a countdown of miles, said visual countdown display being interfaced with a vehicle odometer for counting down miles based upon said odometer;

b) a second screen below said first screen in said display programmed to light up once the preset mileage has been reached, said second screen glowing red when an oil change needs to be performed, and glowing green when a no oil change status is in effect;

c) said second screen displaying a change oil text message on the red screen when an oil change needs to be performed, said reset switch located below said first screen and next to said second screen; and e) a digital timing device that automatically initiates said second screen to indicate an oil change is required after a preset amount of time has passed before mileage countdown reaches zero since the last oil change and overrides the mileage countdown of miles.

2. A method of indicating that an oil change in a vehicle is due comprising the steps of:

a) a user presetting a first screen in said visual display on a dashboard of said vehicle with a number of miles to a next oil change;

b) said visual display interfacing with an odometer of said vehicle to count down miles until zero mileage is reached;

c) a second screen on said visual display changing color and flashing a text message when zero mileage is reached on said first screen; and d) a digital timing device overriding said visual display when a preset amount of time is reached since a last oil change indicating on said second screen that another oil change is due regardless of any mileage remaining on said first screen of said visual display.

* * * * *